A. STEWARD.
Thread Show-Cases.
No. 5,526. Reissued August 5, 1873.
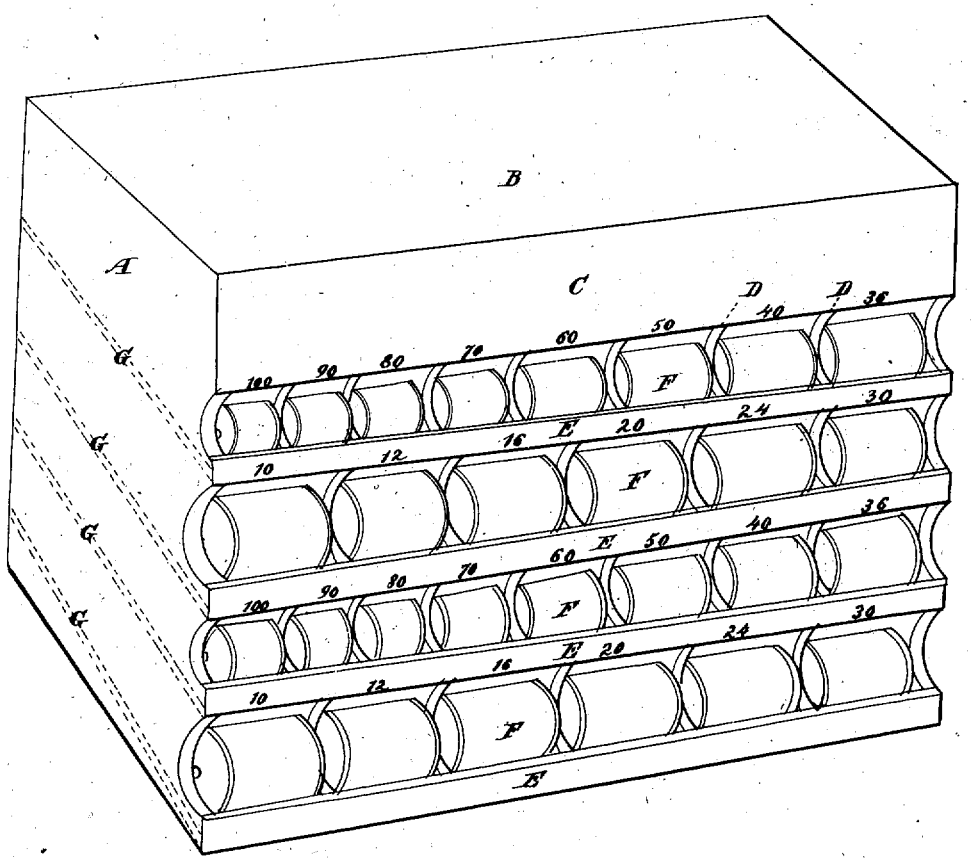
Witnesses:
C. Edquist
H. W. Munn
Inventor:
A. Steward.
Per Munn & Co
Attorneys.

UNITED STATES PATENT OFFICE.

AURELIUS STEWARD, OF CHICAGO, ILLINOIS.

IMPROVEMENT IN THREAD SHOW-CASES.

Specification forming part of Letters Patent No. 79,023, dated June 16, 1868; reissue No. 5,526, dated August 5, 1873; application filed May 17, 1873.

*To all whom it may concern:*

Be it known that I, AURELIUS STEWARD, of Chicago, in the county of Cook and State of Illinois, have invented a new and useful Improvement in Thread Show-Case, of which the following is a specification:

The invention relates to a new and useful improvement in show-cases for containing spool-thread; and consists in the construction and arrangement hereinafter described, whereby a single spool of the various sizes, colors, and numbers of thread is exhibited to the eye in the front of the case, as will be hereinafter more fully described.

The accompanying drawing represents a perspective view of a show-case constructed according to my invention.

A is the end of the case; B, the top; C, fascia; D, partitions; E, stop-cleats. F represents spools of thread; G, the shelves, which slope back and upward, forming inclined planes upon which rows of spools are laid; H, the number, name, or character by which each spool is designated. The shelves G are confined between the ends A of the case. The position of the shelves is indicated by dotted lines in the drawing. The several stories or compartments thus formed I divide by partitions into chambers or cells, the ends of which partitions are shown at D.

As spool-thread is graded in fineness, and the spools are made to correspond therewith in size, I graduate the cells accordingly by placing one end of the shelves nearer together than the other ends, and contract the cells in width to accommodate the length of the spools, leaving only space enough between the partitions to allow the spools to roll freely upon the inclined planes, and space enough between the shelves to allow the spools to be raised in removing them from the case, as hereafter described. The vacant space above the upper shelf I cover with a fascia, as shown at C.

It will be seen that spools placed on the inclined planes will roll out if not prevented. For preventing them I fasten stop-cleats E upon the front edge of each shelf. A short pin may be inserted in the edge of the shelf, or any other device may be adopted for the purpose. The fronts of the partitions, between the shelves, are cut out, so as to admit the thumb and finger for removing the spools.

As the different manufacturers designate in various ways, by numbers, letters, or otherwise, for convenience of the "trade," the varying sizes or colors of their threads, I place the numbers, names, or characters, by which each particular spool is known to the trade, upon the case, above, below, or in close proximity to the cell in which each particular kind is to be kept, as shown at H, so that it may be seen at a glance.

The spools are inserted at the front, but, if desired, the back of the case may be left off or made movable, so that the cells may be filled from the back.

This case is intended more especially for the retail trade, and this exhibition of thread-spools forms an attractive feature in a store.

It is well known that there is a great variety of colors and shades of colors in the threads usually kept by merchants, especially in silk threads, and by this means a single spool of each kind, and also the number, name, or character by which it is known, is exhibited at the front of the case. Now, as each cell is occupied by, or intended for, threads of some particular kind the merchant, in sending his order for a supply to renew his stock, has only to notice the label on the vacant cell to enable him to make out his order for the precise size, color, hue or shade, required, which he could not otherwise accurately describe.

When thread is sold from the case, as the front spool is removed all the remaining spools in that cell roll down the inclined plane, so that a spool is always seen at the front if there are any in the cell. The whole assortment on hand is thus kept constantly in view.

Having thus described my invention, what I claim as new, and desire to secure by Letters Patent, is—

1. A spool-case, provided with parallel rows of apartments for each kind of thread or silk, having inclined bottoms, and open in front and provided with a stop thereat, so that the different kinds of article shall be exhibited to the eye, in the manner described.

2. The parallel apartments of a spool showcase, bottom inclined, to enable the successive spools to be fed forward by gravity, in the manner set forth.

3. The combination, in a spool-case, of partitions and ends, pared away in the arc-form to allow the individual spools to be removed, in the manner specified.

AURELIUS STEWARD.

Witnesses:
JAMES A. HOUSE,
CHARLES H. DIMOND.